United States Patent [19]

Juergens

[11] 4,266,679

[45] May 12, 1981

[54] CONVERTIBLE BOOM MACHINE HAVING MODULAR BOTTOM PORTION

[75] Inventor: Dieter C. Juergens, Bark River, Mich.

[73] Assignee: Harnischfeger Corporation, West Milwaukee, Wis.

[21] Appl. No.: 28,221

[22] Filed: Apr. 9, 1979

[51] Int. Cl.[3] .................. B62D 55/04

[52] U.S. Cl. .................. 212/181; 180/9.2 R; 212/178; 280/30

[58] Field of Search .................. 212/59 R, 66, 67, 68, 212/145; 180/9.2 R, 9.2 C, 9.26; 280/763, 762, 30; 414/687, 694

[56] References Cited

U.S. PATENT DOCUMENTS

| | | | |
|---|---|---|---|
| 3,021,016 | 2/1962 | Noll et al. | 212/145 |
| 3,528,675 | 9/1970 | Brown | 212/145 X |
| 3,740,075 | 6/1973 | Soehnlen | 280/30 X |
| 3,894,747 | 7/1975 | Wisdom et al. | 280/30 |
| 3,929,204 | 12/1975 | Newell | 212/145 X |

*Primary Examiner*—Jeffrey V. Nase

*Attorney, Agent, or Firm*—James E. Nilles

[57] ABSTRACT

The upper works of a boom machine such as a crane is supported for rotation about a vertical axis on a lower portion of modular construction. The lower portion comprises a hub-like member having four leg module holders which are equidistant from said axis and spaced around it at uniform intervals and to each of which a leg module is detachably securable. To outer ends of the leg modules can be secured pad modules or extension leg modules that have ground engaging pads at their outer ends; or laterally opposite pairs of leg modules can be detachably connected to crawler modules. The hub-like member also has a pair of body module holders at opposite sides thereof, each laterally intermediate a pair of leg module holders, to which wheeled transporter modules can be detachably secured. Alternatively, with crawler modules installed, a hydraulic power module for energizing them can be secured to one body module holder. When not supporting the machine for transport or as a truck crane, transporter modules can serve as auxiliary counterweight carriages.

10 Claims, 22 Drawing Figures

CONVERTIBLE BOOM MACHINE HAVING MODULAR BOTTOM PORTION

FIELD OF THE INVENTION

This invention relates to a crane that can be readily converted to a truck crane, a crawler crane, a stationary crane, or a heavy lift crane having a trailer-like counterweight carriage; and the invention is more particularly concerned with a crane or similar machine that is of modular construction and comprises a hub-like member which cooperates with certain modules that are detachably securable to said hub-like member and to one another to provide for convertability of the machine that they comprise.

BACKGROUND OF THE INVENTION

Heretofore it has been conventional to provide certain wheel-mounted cranes with outriggers that could be extended and engaged with the ground to provide fixed, stable support for the crane while it was in operation. Such a crane, when working with its outriggers in place, could not transport a load that it was hoisting, although retraction of the outriggers permitted the unloaded crane to be moved from place to place on its wheels.

A heretofore conventional crawler crane has been capable of transporting a load that it was carrying, since the endless tracks or crawlers on such a crane provided it with a stable base, both when it was moving and when it was standing still. But a crawler crane could not travel on its crawlers for over-the-road transportation from one job site to another; hence, transportation of a crawler crane across any substantial distance required that the machine be loaded onto a flatbed trailer or a railroad car, or that it be disassembled, transported in several loads, and reassembled at a new job site.

Stationary cranes were also available that were intended to be erected at a job site where hoisting operations were to be conducted for a relatively long period of time, and which thereafter had to be disassembled for transportation to a new project at which they were again reassembled.

Each of these types of cranes was relatively specialized, having certain definite advantages and certain definite disadvantages. A contractor who wanted to be able to provide a crane suitable for any type of hoisting operation therefore had to invest in several different cranes, each relatively expensive in itself.

It seldom happens that a contractor has several different jobs simultaneously, each suitable for one of several different cranes. Therefore it has heretofore been necessary for a contractor either to restrict his investment to one or a few cranes and decline jobs for which he was not equipped, or to invest in a variety of cranes only to find that at almost any given time at least one of them was standing idle and thus representing a substantial investment that was yielding no return.

The present invention removes this long-standing dilemma by providing a relatively heavy-duty crane which is substantially more versatile than any heretofore available, so that a contractor or operator can, in effect, equip himself with several different kinds of cranes at a capital cost only slightly higher than was heretofore required for one specialized crane.

It is a more specific object of this invention to provide a convertible crane of modular construction, capable of being altered from one type of crane to another by means of readily interchangeable modules, so that a contractor or crane operator can invest in a set of modules that will provide him with one basic type of crane and, when the need arises, can purchase a few additional modules at relatively modest cost that will enable him to convert to a basically different type of crane.

Another and more specific object of this invention is to provide a convertible crane of modular construction that can be very readily set up as a crawler crane, a stationary crane on a very stable base, or an extra-heavy-lift crane having supplementary counterweight means, and which is further readily convertible to a wheeled transport configuration for over-the-road travel and can be used in that configuration as a truck crane.

SUMMARY OF THE INVENTION

In general, the objects of the invention are achieved in a machine, such as a crane, that has a lower supporting portion and an upper portion that is supported by said lower portion and is rotatable relative thereto about a vertical axis, said upper portion comprising a boom that normally projects upwardly and mechanism for lifting a load supported by said boom, said machine being characterized by: said lower portion comprising a hub-like member that is concentric to said axis and has substantial vertical depth, said hub-like member having a slewing ring on its top upon which said upper portion is rotatably mounted, means at its sides defining four leg module holders, and other means at a pair of its opposite sides defining a pair of body module holders; said means defining said four leg module holders being so arranged that each leg module holder provides for detachable connection to the hub-like member of one of four elongated leg modules which project radially in relation to said axis, said leg module holders being at equal distances from said axis and at substantially uniformly spaced intervals around the hub-like member; and said other means defining said two body module holders being so arranged that each body module holder provides for detachable connection to the hub-like member of a wheeled transporter module, and each of said body module holders being located laterally intermediate a pair of leg module holders.

Each of the elongated leg modules has means at an inner end thereof that provide for detachable connection of the leg module to one of the leg module holders on the hub-like member, and has means at an outer end thereof that provide for selectably alternative detachable connection to the leg module of a ground engaging pad module, an elongated extension leg module having a ground engaging pad at its outer end, or a crawler module. Each crawler module is detachably connectable to the outer ends of a pair of leg modules.

To the body module holders there can be detachably connected a pair of wheeled transporter units which provide for over-the-road transport of the machine and allow it to be operated as a truck crane, the leg modules normally being off of the hub-like member when the transporter units are connected thereto. When not connected to the hub-like units, the transporter units can be employed as auxiliary counterweight carriages. When crawler modules are installed, a hydraulic power module is connected to one of the body module holders.

BRIEF DESCRIPTION OF THE DRAWINGS

In the accompanying drawings, which illustrate what is now regarded as a preferred embodiment of the invention.

DETAILED DESCRIPTION OF THE INVENTION

Figures 1, 2:
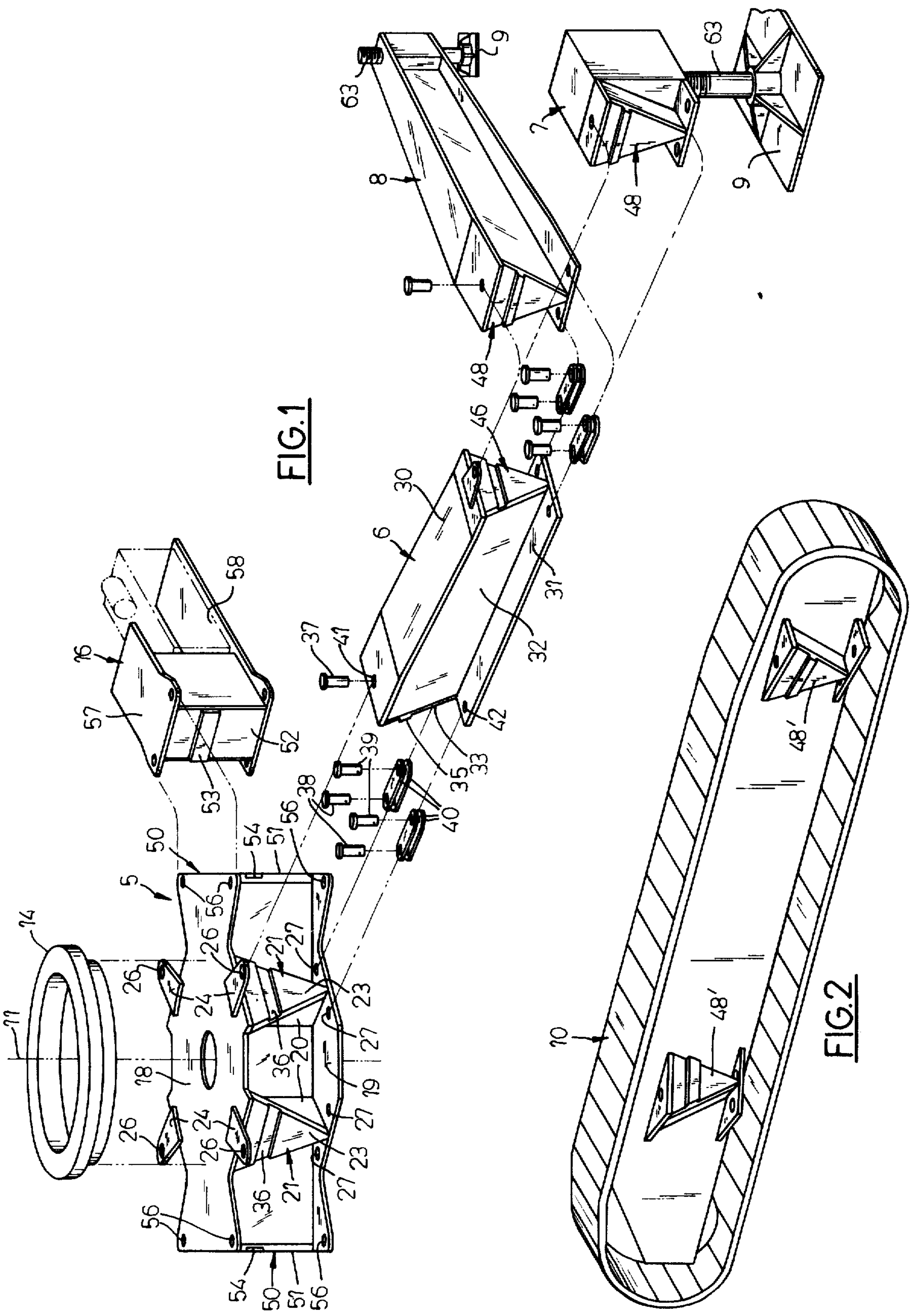
FIG. 1 is a partial exploded perspective view of the lower portion of a convertible crane embodying the principles of this invention, showing the central hub-like member and certain of the modular elements that cooperate with it.
FIG. 2 is a more or less diagrammatic perspective view of a crawler module for a convertible crane embodying the invention.

In the following description, a machine embodying the principles of this invention is referred to as a "crane" for purposes of specific example, but it is to be noted that the term "crane" as used herein is intended to designate any crane-like machine. In general, therefore, the term "crane" herein denotes any machine that has a lower supporting portion and an upper works mounted on the lower portion for rotation relative thereto about a vertical slewing axis, and wherein the upper works comprises a normally upwardly projecting boom and mechanism that comprises power means for lifting a load which is supported by the boom. Inasmuch as the upper works in a crane embodying the principles of this invention can be of any conventional type, the presence of the upper works is merely suggested in the drawings and no details of it are shown.

Referring now to the accompanying drawings, a crane or similar machine that embodies the principles of the present invention has a lower supporting portion that comprises a hub-like member 5 and certain modular elements which are detachably connected to the hub-like member and are to some extent interchangeable with one another. For most purposes the modular elements connected to the hub-like member 5 will comprise four leg or outrigger modules 6 that extend horizontally from the hub-like member, preferably at 90° intervals around it and at 45° angles to the fore-and-aft extending centerline of the hub-like member.

Detachably securable to the outer ends of the leg modules 6 are any of several different supporting or earth-engaging modular elements which can be interchanged with one another for converting the crane as desired. For a stationary crane, the modular elements secured to the outer end of each leg module can be a supporting pad module 7, or can be a leg extension module 8 that has a supporting pad 9 at its outer end. Alternatively, for a crawler crane, the two leg modules 6 at each side of the machine can have their outer ends connected to a crawler module 10.

The leg modules 6, when they are connected to the hub-like member 5, extend radially outwardly in relation to a vertical slewing axis 11 around which the upper works 12 of the crane is rotatable. The hub-like member has on its top a slewing ring 14 which is concentric to that axis and which rotatably supports the upper works 12 in a generally conventional arrangement.

Figure 3:
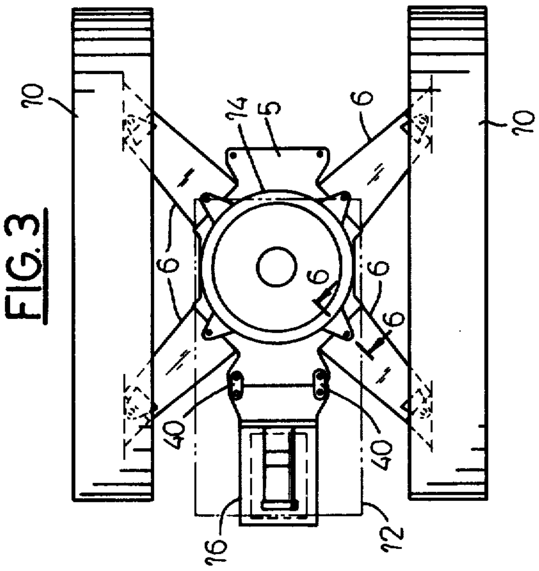
FIG. 3 is a top view of the lower portion of a crawler crane embodying the invention.
Figure 16:
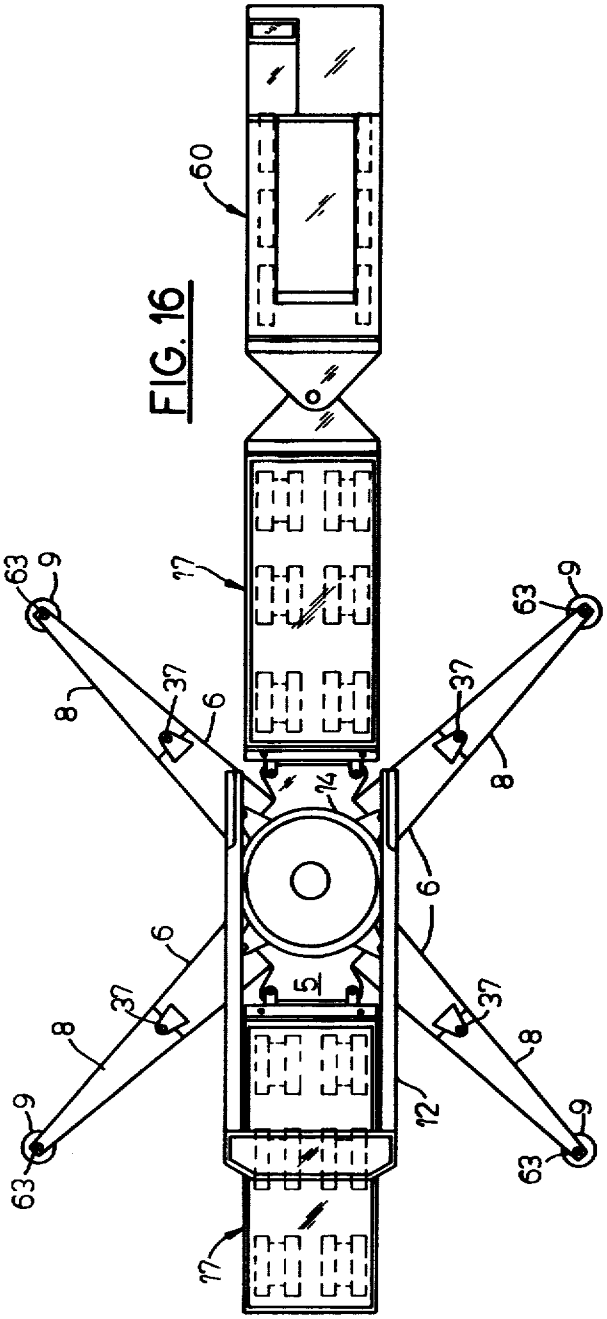
FIG. 16 is a plan view of the crane of this invention in its form for over-the-road transport but with legs or outriggers installed in preparation for emplacing it as a fixed crane.
Figure 17:
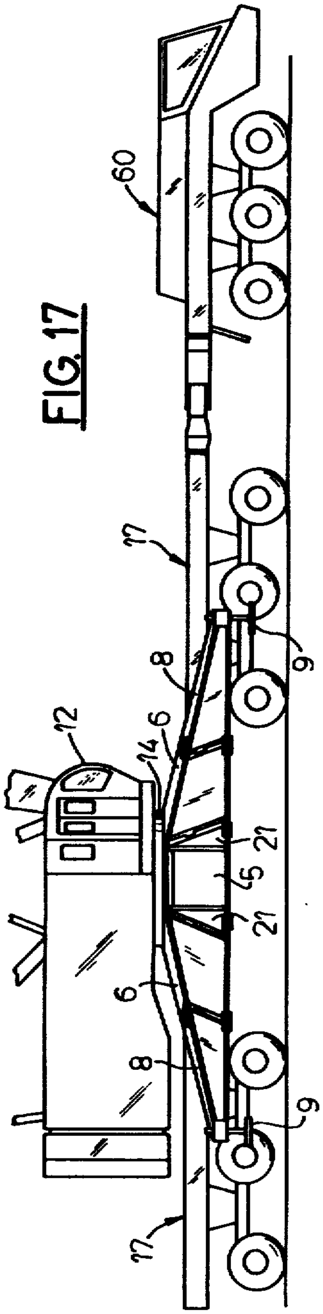
FIG. 17 is a side view of the arrangement shown in FIG. 16.

As will be described in more detail hereinafter, the hub-like member 5 is further so arranged that certain fore-and-aft extending body modules can be interchangeably connected to it, namely a hydraulic pump unit 16 (see FIGS. 3 and 21) that provides for energization of the crawlers 10 when they are installed, or wheeled transporter units 17 (see FIGS. 16 and 17) that provide for over-the-road transport and enable the machine to operate as a truck crane.

Turning now to a more detailed consideration of the hub-like member 5, it comprises a horizontal top plate 18, a horizontal bottom plate 19 and rigid structure 20 that holds the plates 18 and 19 in vertically spaced superimposed relation to one another. The rigid structure 20 can comprise plate-like elements that extend edgewise between the top and bottom plates and are welded to them. The structure 20 can be arranged in any suitable manner which will ensure that the hub-like member as a whole is sturdy, rigid, and capable of supporting large tension, compression and shear forces in every direction, and to that end the hub-like member has substantial vertical depth.

In outline, each of the top and bottom plates 18 and 19 is symmetrical to both a longitudinal centerline and a lateral centerline that are perpendicular to one another and to the slewing axis 11. The slewing ring 14, which can comprise conventional bearings and swing drive mechanism, is mounted on the upper surface of the top plate 18.

The hub-like member 5 has leg module holders 21 at four locations on its sides that are equidistant from the vertical axis 11 and are spaced from one another at equal intervals around that axis. To each of these holders 21 one of the leg modules 6 can be readily detachably connected. As best seen in FIG. 1, each leg module holder comprises an upright abutment plate 23 that faces away from the vertical axis, a lug 24 that overlies the upper surface of the top plate 18 and projects edgewise beyond it and the abutment plate 23 to provide a pin receptacle 26, and a pair of pin receiving holes 27 in the bottom plate 19. Each abutment plate 23 has the shape of an isosceles triangle that has its apex lowermost and has its base uppermost and adjacent to the top plate 18 of the hub-like member along an edge portion thereof. The pin receiving holes 27 in the bottom plate are spaced equal distances to opposite sides of the apex of the abutment plate 23.

Figure 15:
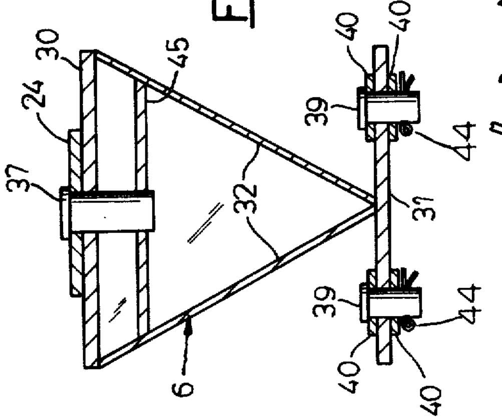
FIG. 15 is a view in vertical section, on an enlarged scale, taken on the plane of the line 15—15 in FIG. 12.
Figure 14:
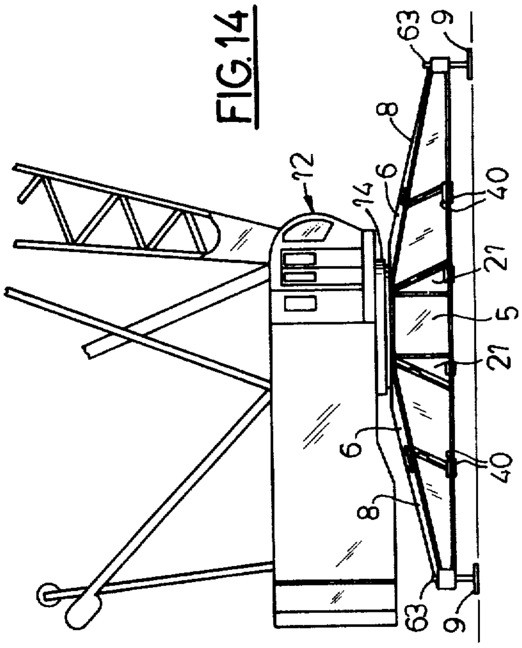
FIG. 14 is a side view of the crane set up as in FIGS. 12 and 13.

Each of the leg modules 6 is preferably of welded construction, generally like that of the hub-like member 5, and comprises an elongated substantially horizontal upper plate 30, an elongated substantially horizontal bottom plate 31, and rigid connecting structure 32 that holds the plates 30 and 31 in vertically spaced superimposed relationship. As shown, the connecting structure 32 comprises a pair of elongated plate-like channel members that are edgewise connected between the horizontal plates 30 and 31 and form a V with one another as best seen in FIG. 15, each channel member 32 having its lower edge welded along the longitudinal center line of the bottom plate 31 and extending upwardly in divergent relation to the other channel member to have its upper edge welded along one of the longitudinal edges of the upper plate 30.

At its inner end each leg module 6 is formed to be matingly connected with any one of the leg module holders 21 on the hub-like member. Thus each leg module has at its inner end a triangular inner abutment plate 33 that is generally similar in shape and size to each of the abutment plates 23 on the hub-like member. When a leg module is assembled to a holder 21 on the hub-like member, the abutment plate 33 on the leg module flatwise opposingly engages the triangular abutment plate 23 on the hub-like member. A laterally elongated tongue 35, projecting from one of the opposing abutment plates (the leg module abutment plate 33, as shown), engages in a mating groove 36 in the other abutment plate to define opposing transversely extending ledges which facilitate preliminary alignment of the leg module with the hub-like member and prevent vertical relative motion between them.

Each leg module is confined against lengthwise outward movement relative to the hub-like member by means of readily detachable connections between them that comprise pins 37, 38, 39 and pairs of links 40. One pin 37 extends down through the hole 26 in the lug 24 and through an aligning hole 41 in the upper plate 30 of the leg module. The pins 38 are received in the holes 27 in the bottom plate of the hub-like member, while the pins 39 are received in holes 42 in the lower plate 31 of the leg module, near its inner end. Each pair of pins 38, 39 cooperates with a pair of links 40, as can be seen from FIGS. 1 and 15, to provide bottom connections between the leg module and the hub-like member. Cotter keys 44 or the like through the lower ends of the pins 38 and 39 hold the lower links 40 in place at the undersides of the coplanar horizontal plates 19 and 31. The upper pin 37 tends to be kept in place by its own weight and by the shear forces acting upon it, but to prevent it from being tilted out of vertical by such shear forces there is a shelflike plate 45 in the leg module, near its inner end and extending between the channel members 32, in which there is a hole wherein the lower end portion of the pins 37 is received.

At its outer end each leg module 6 had a holder 46 which is essentially a counterpart of the holders 21 on the hub-like member; and in like manner each of the supporting member modules 8 and 9 has a connection portion 48 which is essentially a counterpart of the connection portion on the inner end of the leg module. Each of the crawler units 10 has a pair of connection portions 48' on the inner surface of its side frame that are spaced from one another along the length of the crawler unit and are arranged at opposite 45° angles to the side frame for connection of the crawler unit to a pair of leg modules 6.

In addition to the four leg module holders 21, the hub-like member 5 has two body module holders 50 that are at diametrically opposite sides of the vertical axis 11 and are each laterally intermediate a pair of leg module holders 21, so that each is symmetrical to the longitudinal centerline of the hub-like member. To each of these body module holders 50 a body module 16 or 17 is detachably connectable. The two body module holders 50 are spaced at equal distances from the vertical axis 11, but they are at substantially greater distances from that axis than the leg module holders 21 so that the hub-like member is, as a whole, elongated in the fore-and-aft direction in which its body module holder portions extend.

Each of the body module holders comprises a rectangular abutment plate 51 that has flatwise opposing engagement with a generally similar abutment plate 52 on a body module. The opposing abutment plates again have a tongue and groove connection illustrated as a horizontally elongated tongue 53 on the plate 52 and a mating groove 54 in the plate 51. Each of the top and bottom plates 18 and 19 of the hub-like member is widened at each body module holder to provide ears in which there are pin receiving holes 56 that are spaced outwardly from the upright edges of the abutment plate 51. Each of the body modules comprises upper and lower plates 57 and 58 that provide similar apertured ears. Each body module is secured to the hub-like member by four sets of links and pins, connected like the pins and links 38, 39, 40 that comprise the bottom connections of the leg modules 6.

Although the upper works 12 that is mounted on the hub-like member 5 can be considered a module in itself, and could be interchangeable with other and different upper works modules, it will usually be advantageous to have a hub-like member for each upper works module, to avoid the inconvenience of disassembling the upper works from the hub-like member.

Usually a crane of this invention will be transported to a job site by means of transporter body modules 17 that are connected to the front and rear body module holders 50 of the hub-like member. Such transporter body modules can be of a known type, having castering or power-steerable wheel sets, and they may have powered wheels, to be self-propelling, or may comprise trailer units to be towed by a tractor vehicle such as that shown at 60 in FIGS. 16 and 17. It will be seen that with self-propelled transporter modules 17 the machine is essentially a truck crane and can be used as such.

Figure 18:
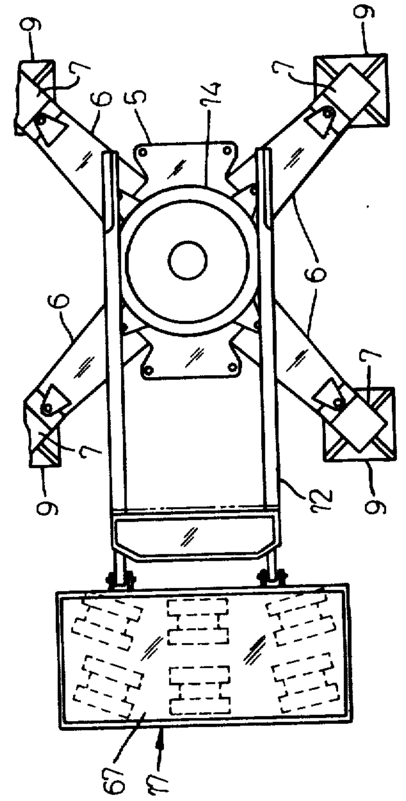
FIG. 18 is a plan view of the lower portion of the crane of this invention set up for operation as a stationary crane having a counterweight carriage that adapts it for lifting very heavy loads.
Figure 19:
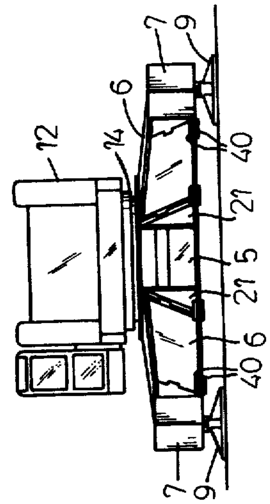
FIG. 19 is a front view of the crane, set up as shown in FIG. 18 but with its boom and other superstructure omitted.
Figure 20:
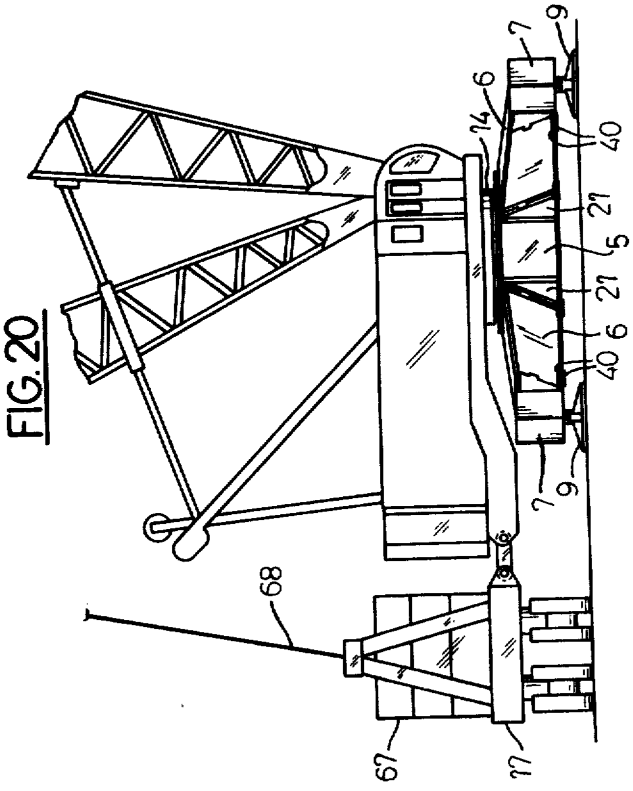
FIG. 20 is a side view of the crane set up as in FIGS. 18 and 19.

If, at the job site, loads are to be handled which are larger than those normally assigned to a truck crane, leg modules 6 are attached to the leg module holders 21 of the hub-like member. If a wide-stance base is needed, extension leg modules 8 can be attached to the leg modules 6, to provide the crane with a broad, stable base, as shown in FIGS. 12–14, 16 and 17. At their outer ends the extension modules 8 have ground-engaging pads 9 on jacks 63, and these are run down into firm engagement with the surface, to support the crane in a level attitude and take its weight off of the wheels of the transporter units 17, whereupon the transporter modules 17 can be deteched from the hub-like member. If a smaller base is desired, a supporting pad module 7 can be attached to the outer end of each leg module 6, as illustrated in FIGS. 18, 19 and 20, and these too have ground-engaging pads 9 mounted on jacks 63. It will be understood that the jacks 63 may comprise hydraulic cylinders instead of screw jacks as shown.

Figure 4:
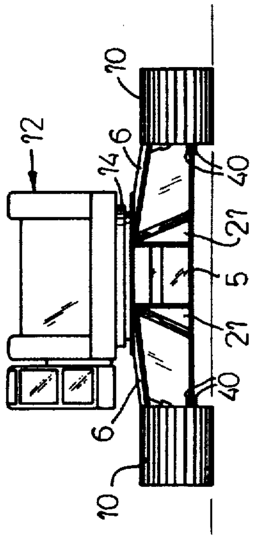
FIG. 4 is a front view of the crane shown in FIG. 3, with its boom and other superstructure omitted.
Figure 6:
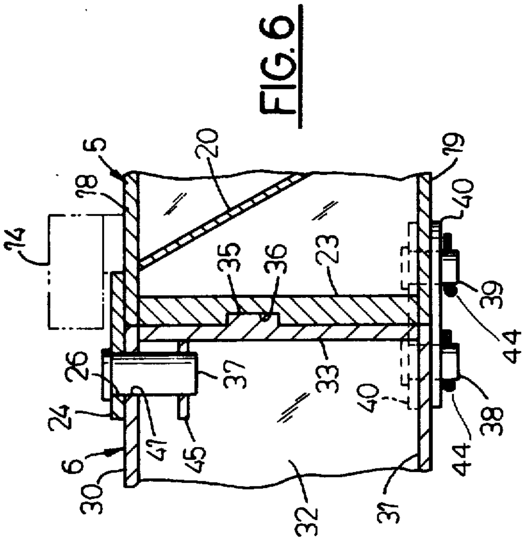
FIG. 6 is a view in vertical section, on an enlarged scale, taken on the plane of the line 6—6 in FIG. 3.
Figure 5:
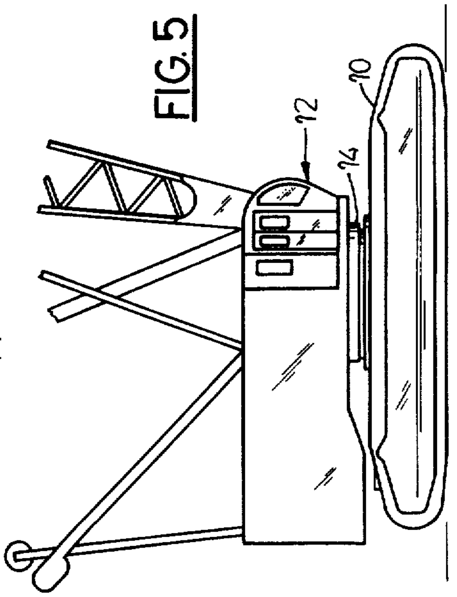
FIG. 5 is a side view of the crane shown in FIGS. 3 and 4.
Figure 9:
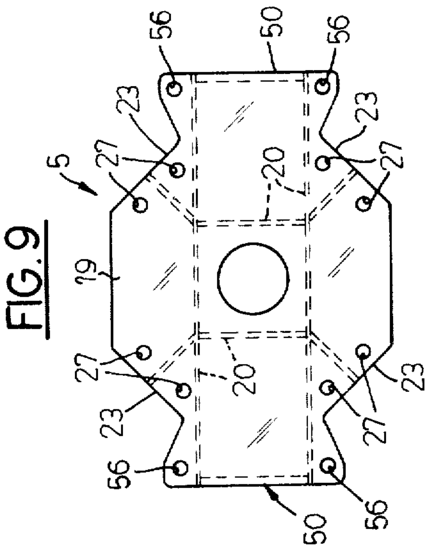
FIG. 9 is a bottom view of the hub-like member.
Figure 8:
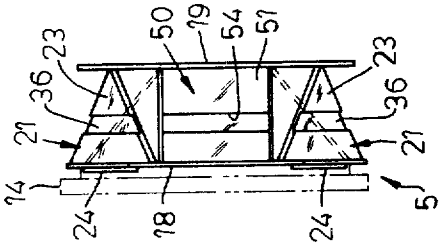
FIG. 8 is an end view of the hub-like member.
Figure 7:
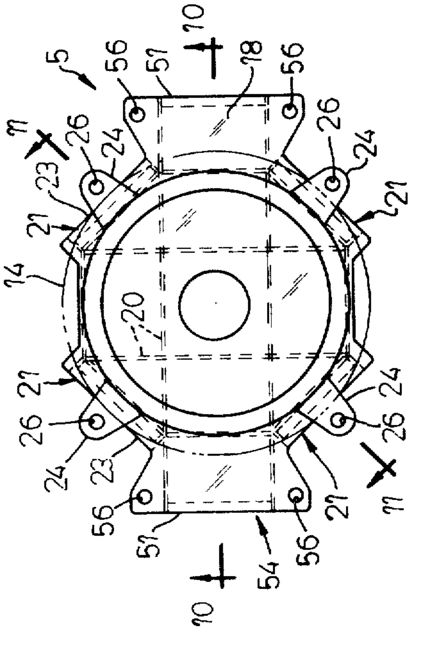
FIG. 7 is a plane view of the hub-like member.
Figure 10:
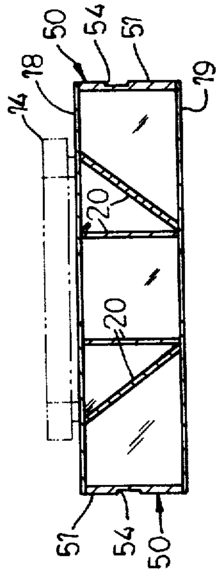
FIGS. 10 and 11 are views of the hub-like member in vertical section, respectively taken on the planes of the lines 10—10 and 11—11 in FIG. 7.
Figure 11:
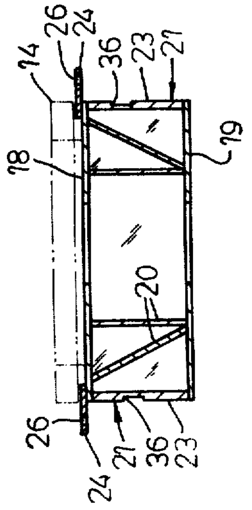
Figure 12:
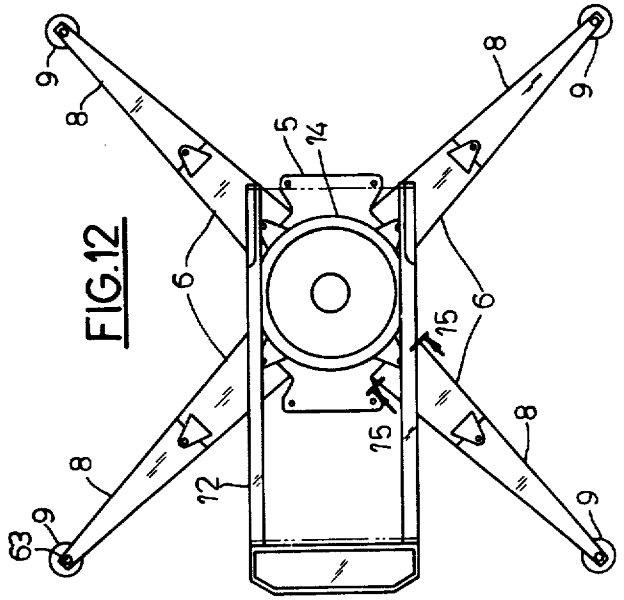
FIG. 12 is a plan view of the lower portion of the crane, set up for operation as a stationary crane.
Figure 13:
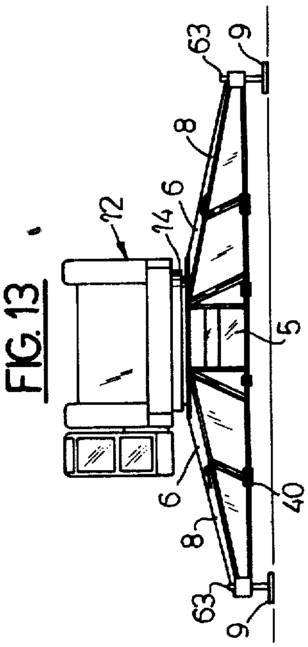
FIG. 13 is a front view of the crane, set up as shown in FIG. 12, but with its boom and other superstructure omitted.

As a further alternative, crawler units 10 can be attached to the outer ends of the laterally opposite pairs of leg modules 6, (FIGS. 3–5), and in that case a mechanical or hydraulic power module 16 will be connected to the hub-like member 5 to provide hydraulic pressure fluid or mechanical driving force for actuating the crawlers. It will be understood that the power module 16 has suitable connections (not shown) with the crawler units 10.

In place of crawler units, beam-like side frames could be connected to the laterally opposite pairs of leg modules 6. Although such side frames are not shown as such, they would correspond generally to the crawler modules 10 in appearance, placement and function but would of course lack the mobility of the crawlers.

When heavy loads are to be lifted, a U-shaped counterweight frame 65 can be mounted to the upper works. Transporter units 17 can be connected to the counterweight frame 65 and loaded with an auxiliary counterweight 67 in a known arrangement illustrated in FIGS. 18 and 20.

Figure 21:
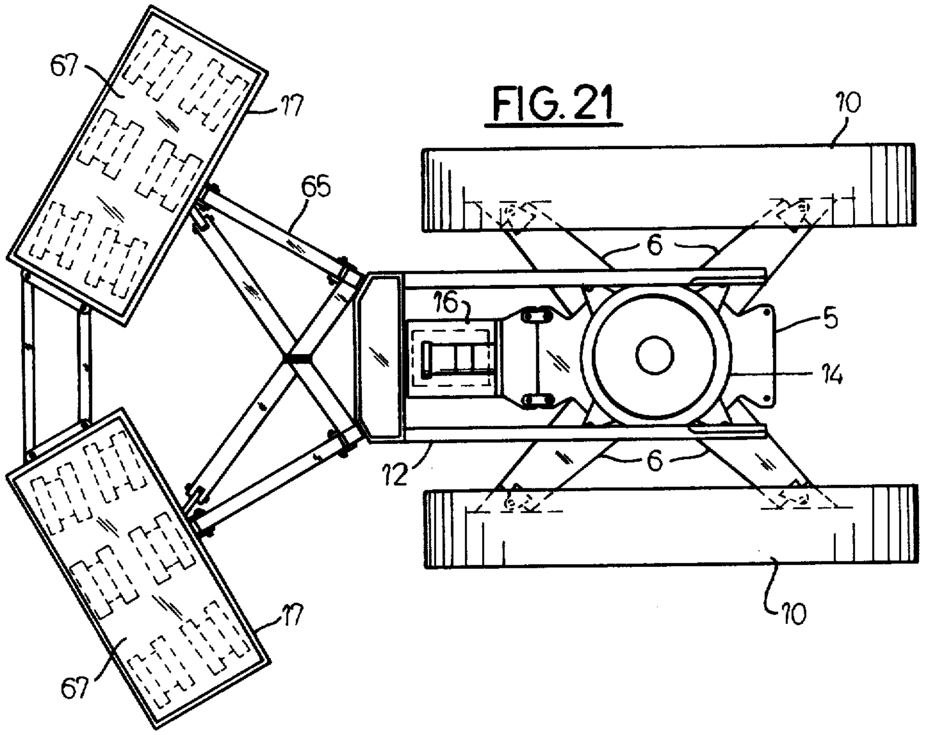
FIG. 21 is a plan view of the lower portion of the crane, set up as a crawler crane with connected auxiliary counterweight carriages that adapt it to the lifting of very heavy loads.
Figure 22:
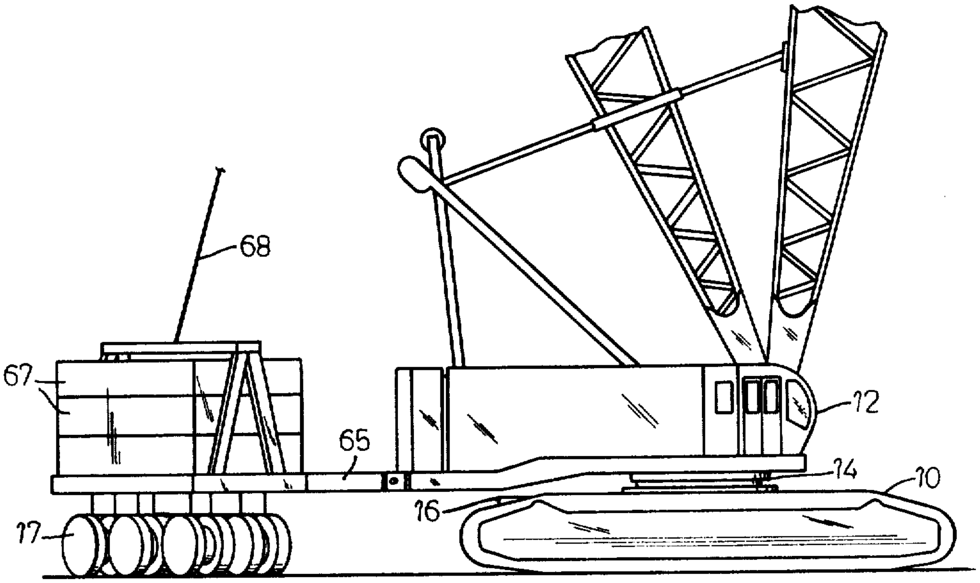
FIG. 22 is a side view of the arrangement shown in FIG. 21.

The arrangement illustrated in FIGS. 21 and 22 incorporates two transporter modules 17 that are rigidly connected with the counterweight frame 65 and with one another, and each of which carries an auxilliary counterweight 67. The two transporter modules 17 are spaced to opposite sides of the longitudinal centerline of the upper works 12, and a guy line 68 extends up from each to a mast on the upper works so that the crane is stabilized not only against forward tipping but also against lateral tilting. This arrangement is in accordance with principles disclosed and claimed in my copending application, Ser. No. 42,366, filed May 25, 1979, to which reference can be made for further information about it.

From the foregoing description taken with the accompanying drawings it will be apparent that this invention provides a crane or similar machine that has its lower portion of modular construction so as to be readily convertible for over-the-road transport and for use as a truck crane, or to a crawler crane, or to a stationary crane having a wide or a narrow base; and it will also be apparent that the transporter modules which can be installed for over-the-road transportation of the crane or for its use as a truck crane can also be employed as auxiliary counterweight carriages when the machine is operating as a stationary crane or a crawler crane and is required to lift very heavy loads.

I claim:

1. A machine, such as a crane, that has a lower supporting portion and an upper portion that is supported by said lower portion and is rotatable relative thereto about a vertical axis, said upper portion comprising a boom that normally projects upwardly and mechanism for lifting a load supported by said boom, said machine being characterized by:

said lower portion comprising a hub-like member that is concentric to said axis and has substantial vertical depth, said hub-like member having (1) a slewing ring on its top, concentric to said axis and upon which said upper portion is rotatably mounted, (2) means at its sides defining four leg module holders, (a) each arranged to provide for detachable connection to the hub-like member at vertically spaced locations of one of four elongated leg modules which project radially in relation to said axis, (b) said leg module holders being further arranged (1) at equal distance from said axis and (2) at substantially uniformly spaced intervals around the hub-like member; and (3) said hub-like member having other means at a pair of opposite sides thereof that define two body module holders, (a) each arranged to provide for detachable connection to the hub-like member of a wheeled transporter module, and (b) each of said body module holders being located laterally intermediate a pair of leg module holders.

2. The machine of claim 1, further characterized by: said lower portion further comprising four elongated leg modules, (1) each detachably secured at an inner end thereof to one of said leg module holders, and (2) each having at its outer end means for detachably securing to it a modular supporting element.

3. A hub-like member to which modular elements can be detachably connected to comprise therewith a bottom portion for a boom machine such as a crane, and whereon upper works of the machine can be supported for rotation about a vertical axis, detachability of said modular elements from said hub-like member enabling modular elements to be interchanged with one another so that the machine can have any selected one of a plurality of different capabilities, said hub-like member being characterized by:

A. top and bottom surfaces that are spaced apart by a substantial distance so that the hub-like member has susbstantial depth;

B. four leg module holders at the sides of said hub-like member for detachable securement thereto of four elongated leg modules that project radially in relation to said axis, each leg module holder comprising fastening means near said top surface and said bottom surface, respectively, said leg module holders being arranged (1) at equal distances from said axis and (2) at substantially uniformly spaced intervals around said axis;

C. two body module holders at the sides of said hub-like member for detachable securement thereto of a pair of body modules, each body module holder comprising fastening means near said top surface and said bottom surface, respectively, said body module holders being arranged (1) at opposite sides of said hub-like member and (2) each laterally intermediate a pair of leg module holders; and D. a slewing ring on said top surface, concentric to said vertical axis, for rotatably supporting upper works of the machine.

4. The hub-like member of claim 3 wherein said top and bottom surfaces are respectively defined by horizontal top and bottom plates, further characterized by plate-like rigid connecting members extending edgewise between said top and bottom plates to hold them in vertically spaced relationship and concentric to said vertical axis.

5. The hub-like structural member of claim 3, in combination with:

four elongated leg modules, (1) each having at an inner end thereof (a) top and bottom surfaces spaced apart by substantially said distance, and (b) fastening means near said top surface and said bottom surface, respectively, that are cooperable with said fastening means of a leg module holder for detachable securement of the leg module to the hub-like member; and (2) each having at an outer end thereof means for detachable securement of a modular supporting element thereto.

6. The combination of claim 5, further characterized by:

flatwise opposed abutment plates on each leg module holder and on a leg module detachably secured thereto, respectively, said abutment plates respectively having transversely extending horizontal ledges which opposingly engage one another to confine the leg module and the hub-like member against vertical displacement relative to one another.

7. The combination of claim 5, in further combination with:

a mounting pad module for each of said leg modules, each mounting pad module being detachably securable to said means at the outer end of a leg module for detachable securement of a modular supporting element thereto.

8. The combination of claim 5, in further combination with:

a pair of crawler modules, each comprising (1) a horizontally elongated crawler side frame, (2) an endless ground engaging track lengthwise surrounding said crawler side frame, and (3) means on said crawler side frame for detachable securement thereto of the outer end portions of a pair of leg modules.

9. The combination of claim 8, further combination with:

a power body module detachably secured to one of said body module holders on the hub-like member, said power body module comprising means providing a source of power for energizing said crawler modules.

10. The hub-like member of claim 3, in combination with:

a pair of wheeled transporter body modules, each detachably secured to one of said body module holders to support the hub-like member for wheeled transport.

* * * * *